Patented Aug. 4, 1925.

1,548,345

UNITED STATES PATENT OFFICE.

EMILE BINDSCHEDLER, OF LANSDOWNE, PENNSYLVANIA, ASSIGNOR TO TUBIZE ARTIFICIAL SILK COMPANY OF AMERICA, A CORPORATION OF DELAWARE.

PROCESS FOR THE RECOVERY OF AMMONIA AND OTHER VALUABLE CHEMICALS FROM WASTE DENITRATION LIQUORS.

No Drawing.   Application filed May 16, 1923.   Serial No. 639,458.

*To all whom it may concern:*

Be it known that I, EMILE BINDSCHEDLER, a citizen of the Republic of Switzerland, residing in Lansdowne, county of Delaware, in the State of Pennsylvania, have invented certain new and useful Improvements in Processes for the Recovery of Ammonia and other Valuable Chemicals from Waste Denitration Liquors, of which the following is a true and exact description.

This invention relates to the recovery of valuable chemicals from waste liquors, resulting from the process of denitrating nitrocellulose silk with alkali metal—or alkali earth metal sulfhydrates. In the case of sodium sulfhydrate, which is preferably used for the denitration process, the waste liquors contain sodium polysulphides, some unchanged sodium sulfhydrate and a small amount of sodium thiosulphate, as sulphur compounds, sodium nitrite and ammonia as nitrogen compounds.

Several processes have been proposed for the working up of said liquors without, however, finding industrial application.

By this method valuable chemicals can be recovered in a simple manner and with only small expense. I have discovered that on prolongated heating of the waste liquor to the boiling point, ammonia is given off to a much greater amount than originally contained in the liquor. It takes from 4 to 6 hours to complete the reaction, but the latter can be considerably shortened by heating at a higher temperature, preferably under pressure. During the reaction some sulphur settles out and the original dark color of the liquid becomes more and more light. In the meantime while ammonia is continuously formed and driven off, sodium thiosulphate is formed to a large amount and the polysulphides and sodium nitrite disappear almost completely. It seems that unchanged sodium sulfhydrate and polysulphides react with the nitrite, which could not at all be foreseen. The reaction can be accelerated by passing air through the liquors and can be illustrated by the following equations:

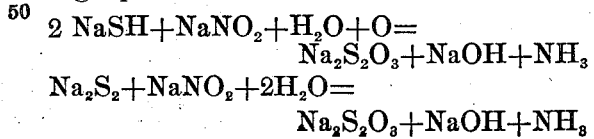

The ammonia vapors produced during the boiling process are condensed or preferably converted into ammonium sulphate by absorption in sulphuric acid and the remaining liquor after separating of some sulphur is concentrated and cooled, whereby sodium thiosulphate crystallizes out. The remaining mother liquors containing mostly caustic soda and some sodium thiosulphate, can be neutralized with nitrecake a by-product from nitric acid needed in the manufacture of nitrocellulose silk, whereby sulphur separates out, while the filtered solution upon cooling yields crystals of sodium sulphate, which on reduction with carbonaceous matters, can be converted into sodium sulfhydrate, according to well known methods and be reused for denitration purposes.

In this way a complete cycle is made between the treatment of the waste liquors and the manufacture of sodium sulfhydrate, the materials used being only cheap or valueless by-products like nitrecake and denitration waste liquors, the only material to be purchased being coal, while the products obtained, ammonium sulphate, sodium thiosulphate and sulphur are of substantial value. In case it is not desired to recover thiosulphate, the liquor resulting after the formation and removal of the ammonia can be directly acidified by waste sulphuric acid or nitrecake, whereby a greater amount of sulphur and sodium sulphate is obtained at the expense of sodium thiosulphate.

Having now described my invention, what I claim as new and desire to secure by Letters Patent, is:

1. The method of treating waste liquors from denitration by alkali earth metal sulfhydrates for the formation of ammonia which consists in causing a reaction between the chemical ingredients of the waste liquors by prolonged heating whereby the sodium nitrite is decomposed and its nitrogen component converted into ammonia.

2. The method of treating waste liquors from denitration by alkali earth metal sulfhydrates for the formation of ammonia which consists in causing a reaction between the chemical ingredients of the waste liquors by prolonged heating and passing air through the liquor whereby the sodium nitrite is decomposed and its nitrogen component converted into ammonia.

3. The method of treating waste liquors from denitration by alkali earth metal sulfhydrates for the formation of ammonia and recovery of sodium sulphate which consists in causing a reaction between the chemical ingredients of the waste liquors by prolonged heating whereby the sodium nitrite is decomposed and its nitrogen component converted into ammonia, adding nitrecake to the alkaline mother liquors to produce sodium sulphate.

4. The method of treating waste liquors from denitration by alkali earth metal sulfhydrates for the formation of ammonia and recovery of sodium sulphate which consists in causing a reaction between the chemical ingredients of the waste liquors by prolonged heating whereby the sodium nitrite is decomposed and its nitrogen component converted into ammonia, separating sodium thiosulphate from the mother liquors by concentrating and cooling said liquors and adding nitrecake to the alkaline mother liquors to produce sodium sulphate.

5. The method of treating waste liquors from denitration by alkali earth metal sulfhydrates for the formation of ammonia and recovery of sodium sulphate and sulphur which consists in causing a reaction between the chemical ingredients of the waste liquors by prolonged heating whereby the sodium nitrite is decomposed and its nitrogen component converted into ammonia, adding nitrecake to the alkaline mother liquors to produce sodium sulphate and separating precipitated sulphur from the liquor by filtration.

6. The method of treating waste liquors from denitration by alkali earth metal sulfhydrates for the formation of ammonia and recovery of sulphur, sodium thiosulphate and sodium sulphate which consists in causing a reaction between the chemical ingredients of the waste liquors by prolonged heating whereby the sodium nitrite is decomposed and its nitrogen component converted into ammonia, separating sulphur from the liquor by filtration, separating sodium thiosulphate from the mother liquor freed from sulphur by concentration and cooling said liquor, adding nitrecake to the remaining alkaline mother liquor to produce sodium sulphate and separating sulphur from the liquor by filtration.

EMILE BINDSCHEDLER.